(12) United States Patent
Smith et al.

(10) Patent No.: US 7,286,142 B2
(45) Date of Patent: Oct. 23, 2007

(54) SYSTEM AND METHOD FOR OPTIMISING HALFTONING PRINTER PERFORMANCE

(75) Inventors: David Christopher Smith, Quakers Hill (AU); Giles Puckett, Highvale (AU)

(73) Assignee: Canon Kabushiki Kaisha, Tokyo (JP)

( * ) Notice: Subject to any disclaimer, the term of this patent is extended or adjusted under 35 U.S.C. 154(b) by 399 days.

(21) Appl. No.: 10/393,249

(22) Filed: Mar. 21, 2003

(65) Prior Publication Data
US 2003/0227463 A1    Dec. 11, 2003

(30) Foreign Application Priority Data
Mar. 25, 2002    (AU) ...................................... PS1342

(51) Int. Cl.
*G09G 5/02* (2006.01)
*G09G 5/00* (2006.01)

(52) U.S. Cl. .................. 345/629; 345/596; 345/597; 345/598; 345/599; 345/619

(58) Field of Classification Search ................ 345/421, 345/422, 589, 592, 596–599, 619–641; 358/3.03, 358/3.06
See application file for complete search history.

(56) References Cited

U.S. PATENT DOCUMENTS

| | | | | |
|---|---|---|---|---|
| 5,555,094 A | | 9/1996 | Lefebvre et al. | 358/298 |
| 5,668,931 A | * | 9/1997 | Dermer | 358/1.4 |
| 5,748,986 A | | 5/1998 | Butterfield et al. | 395/763 |
| 5,946,451 A | | 8/1999 | Söker | 395/109 |
| 5,949,964 A | | 9/1999 | Clouthier et al. | 395/109 |
| 5,966,467 A | | 10/1999 | Davies | 382/237 |
| 5,986,661 A | * | 11/1999 | Hemingway | 345/421 |
| 6,046,748 A | | 4/2000 | Horowitz et al. | 345/431 |
| 6,108,014 A | | 8/2000 | Dye | 345/507 |

(Continued)

FOREIGN PATENT DOCUMENTS

DE    100 12 521    9/2001

(Continued)

*Primary Examiner*—Kee M Tung
*Assistant Examiner*—Chante Harrison
(74) *Attorney, Agent, or Firm*—Fitzpatrick, Cella, Harper & Scinto

(57) ABSTRACT

A method of rendering a plurality of graphical objects of an image on a scanline basis, with each scanline having at least one run of pixels, and each run of pixels being associated with at least one of the graphical objects such that the pixels of the run are within edges of the at least one graphical object, includes the steps of decomposing each of the graphical objects into at least one edge representing the corresponding graphical object, and sorting one or more arrays containing the edges representing the graphical objects of the image. At least one of the arrays is sorted in an order from a highest priority graphical object to a lowest priority graphical object. Additional steps include, for each run of pixels of each scanline, determining edges of the graphical objects defining the run, graphical objects contributing to the run of pixels and edges of the contributing graphical objects, using the one or more arrays, and generating the run of pixels by halftoning pixel data within the edges of a highest priority contributing graphical object, if the highest priority contributing graphical object is opaque, otherwise, compositing data associated with the highest priority contributing graphical object and one or more further contributing graphical objects, and halftoning the composited data.

4 Claims, 6 Drawing Sheets

U.S. PATENT DOCUMENTS

| | | | |
|---|---|---|---|
| 6,137,589 A | 10/2000 | Obrador et al. | 358/1.16 |
| 6,268,859 B1 | 7/2001 | Andresen et al. | 345/421 |
| 6,483,519 B1 | 11/2002 | Long et al. | 345/619 |
| 6,795,048 B2 | 9/2004 | Lie | 345/88 |

FOREIGN PATENT DOCUMENTS

| | | |
|---|---|---|
| EP | 0 924 651 | 6/1999 |
| EP | 0 924 653 | 6/1999 |
| EP | 1 154 632 | 11/2001 |
| JP | 9-18703 | 1/1997 |
| JP | 11-147344 | 6/1999 |
| JP | 2000-137825 | 5/2000 |
| JP | 2000-235643 | 8/2000 |
| JP | 2002-63583 | 2/2002 |
| KR | 2001-85276 | 9/2001 |
| WO | WO96/31837 | 10/1996 |
| WO | WO 00/00951 | 1/2000 |
| WO | WO 00/68887 | 11/2000 |

\* cited by examiner

SYSTEM AND METHOD FOR OPTIMISING HALFTONING PRINTER PERFORMANCE

CROSS-REFERENCE TO RELATED PATENT APPLICATIONS

This application claims the right of priority under 35 U.S.C. § 119 based on Australian Patent Application No. PS1342, filed Mar. 25, 2002, which is incorporated by reference herein in its entirety as if fully set forth herein.

TECHNICAL FIELD OF THE INVENTION

The present invention relates generally to computer graphics and, in particular, to rendering graphical objects. The present invention relates to a method and apparatus for rendering graphical objects. The invention also relates to a computer program product including a computer readable medium having recorded thereon a computer program for rendering graphical objects.

BACKGROUND OF THE INVENTION

Field of the Invention

Many conventional printing systems, such as those based on ink-jet technology, print an image by forming extremely small droplets (dots) of ink onto a page. Most of these conventional printing systems do not utilise continuous-tone printers, as known in the relevant art. That is, dots that form an image printed by one of these conventional printing systems, are either fully present or fully absent. To achieve a wide range of colors, such printers use conventional dithering or halftoning methods that approximate a desired color with a pattern of dots in two or more available colors.

One known method of rendering pages using a printer, includes the steps of generating an image of a page in a frame buffer configured within a computer memory connected to the printer, and then performing a halftoning operation on the image after the image is fully generated for every pixel of the page. In order to then print the image, the arrangement of dots representing the image of the printed page needs to be calculated. Such a calculation is a computationally intensive process particularly if the calculation has to be performed for every pixel on the output page. This problem is further exacerbated if the printer device has a high output resolution.

Another known method of rendering pages on a printer, seeks to reduce memory usage by performing halftoning on each graphical object of an image before the graphical objects are rendered into a frame buffer, thus allowing the frame buffer to be much smaller. However, this method suffers from two major disadvantages. Firstly, graphical objects may overlap, requiring a great deal of work to be done in halftoning areas of graphical objects that will never be printed. Secondly, if graphical objects are not fully opaque (ie possess some transparency) and/or are rendered using logical raster operations, then graphical object data that is below the transparent objects on a page can be destroyed, producing incorrect results in an output image.

Thus, a need clearly exists for an improved rendering method, which provides improvements in both speed and memory usage when rendering opaque and overlapping objects.

SUMMARY OF THE INVENTION

It is an object of the present invention to substantially overcome, or at least ameliorate, one or more disadvantages of existing arrangements.

According to one aspect of the present invention there is provided a method of creating an image, said image being formed by rendering a plurality of graphical objects on a scanline basis, where each scanline comprises at least one run of pixels, said method comprising the steps of:
  (I) forming an array representing said graphical objects of said image, said array being sorted in an order from a top-most graphical object to a bottom-most graphical object; and
  (II) for each scanline of said image and for each run of pixels of said scanline:
    (II) (i) traversing said array to determine objects contributing to said run of pixels; and
    (II)(ii) compositing data associated with one or more of said contributing objects and halftoning the composited data to generate said run of pixels.

According to another aspect of the present invention there is provided an apparatus for creating an image, said image being formed by rendering a plurality of graphical objects on a scanline basis, where each scanline comprises at least one run of pixels, said apparatus comprising:
  array forming means for forming an array representing said graphical objects of said image, said array being sorted in an order from a top-most graphical object to a bottom-most graphical object;
  traversing means for traversing said array to determine objects contributing to a run of pixels of a scanline; and
  compositing means for compositing data associated with one or more of said contributing objects and halftoning the composited data to generate said run of pixels.

According to still another aspect of the present invention there is provided a computer program for creating an image, said image being formed by rendering a plurality of graphical objects on a scanline basis, wherein each scanline comprises at least one run of pixels, said program comprising code for executing the following steps:
  (I) forming an array representing said graphical objects of said image, said array being sorted in an order from a top-most graphical object to a bottom-most graphical object; and
  (II) for each scanline of said image and for each run of pixels of said scanline:
    (II) (i) traversing said array to determine objects contributing to said run of pixels; and
    (II)(ii) compositing data associated with one or more of said contributing objects and halftoning the composited data to generate said run of pixels.

According to still another aspect of the present invention there is provided a computer readable medium, having a program recorded thereon, where the program is configured for creating an image, said image being formed by rendering a plurality of graphical objects on a scanline basis, wherein each scanline comprises at least one run of pixels, said program comprising code for executing the following steps:
  (I) forming an array representing said graphical objects of said image, said array being sorted in an order from a top-most graphical object to a bottom-most graphical object; and
  (II) for each scanline of said image and for each run of pixels of said scanline:
    (II) (i) traversing said array to determine objects contributing to said run of pixels; and (II)(ii) compositing data associated with one or more of said contributing objects and halftoning the composited data to generate said run of pixels.

Other aspects of the invention are also disclosed.

BRIEF DESCRIPTION OF THE DRAWINGS

One or more embodiments of the present invention will now be described with reference to the drawings, in which.

DETAILED DESCRIPTION INCLUDING BEST MODE

Figure 1:
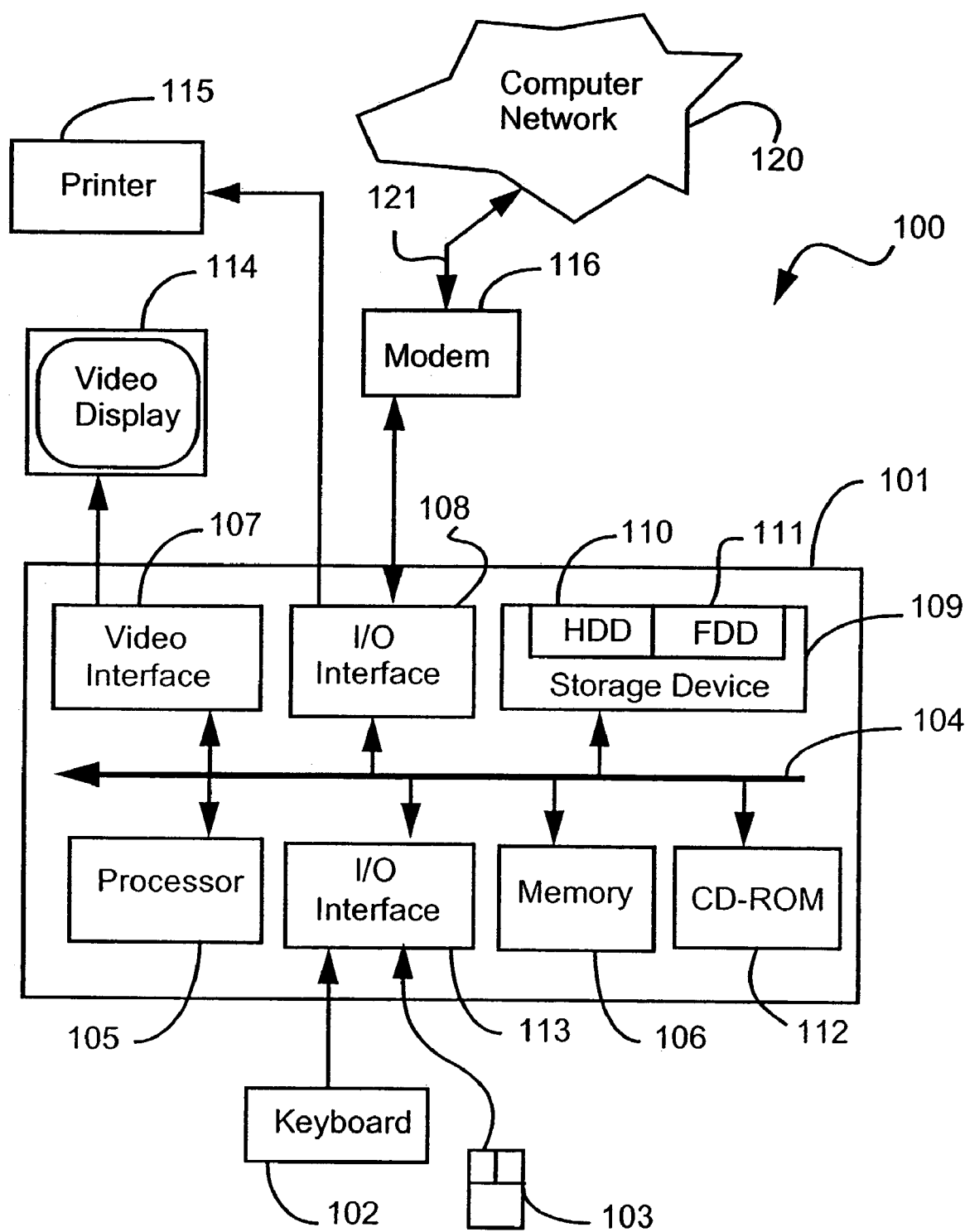
FIG. 1 is a schematic block diagram of a general purpose computer upon which arrangements described can be practiced.

Where reference is made in any one or more of the accompanying drawings to steps and/or features, which have the same reference numerals, those steps and/or features have for the purposes of this description the same function (s) or operation(s), unless the contrary intention appears.

Figure 5A:
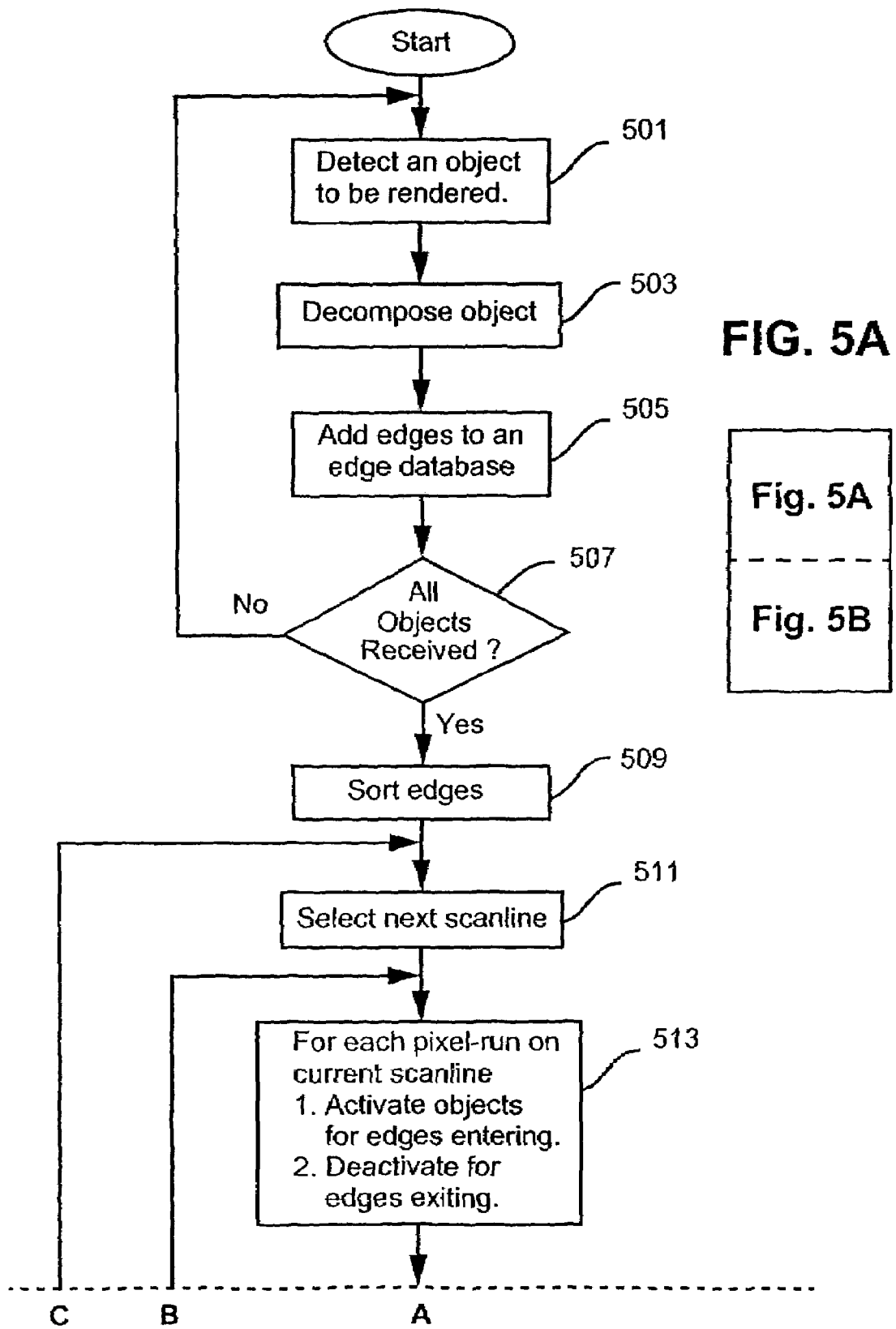
FIGS. 5A and 5B show a flowchart for a method of rendering graphical objects for printing.
Figure 5B:
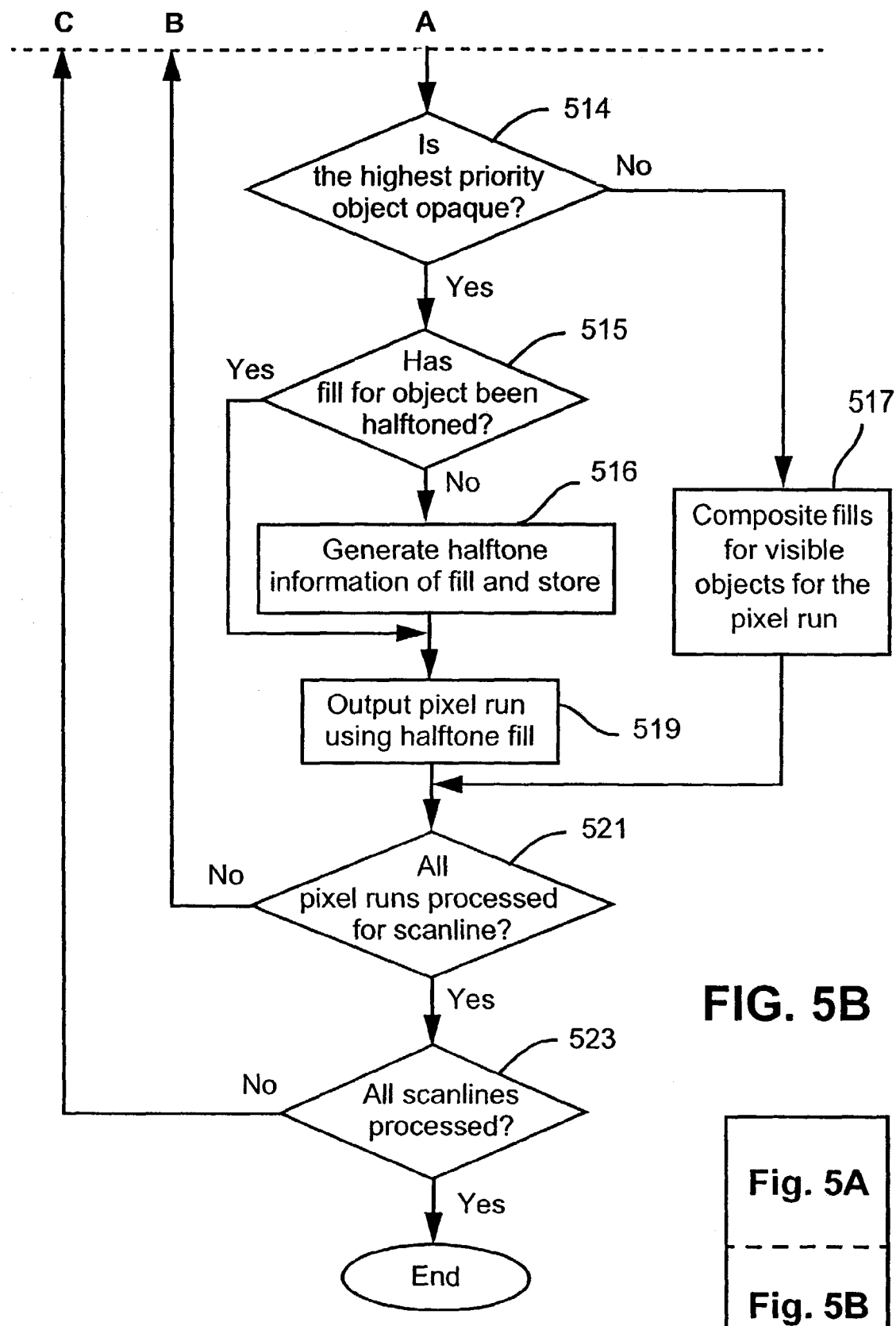

A method 500 of rendering graphical objects is described below with reference to FIGS. 5A and 5B. The principles of the method 500 have general applicability to the rendering of graphical objects. However, for ease of explanation, the steps of the method 500 are described with reference to the rendering of graphical objects for printing on a page. It is not intended that the present invention be limited to the described arrangement. For example, the method 500 may have application to the rendering of graphical objects for display on a liquid-crystal or other display device, which has the characteristic that dots that comprise the displayed image are fully present or fully absent. Such display devices are often driven by embedded computing systems having extremely constrained memory and performance.

The method 500 is preferably practiced using a general-purpose computer system 100, such as that shown in FIG. 1 wherein the processes of FIGS. 2 to 5B may be implemented as software, such as an application program executing within the computer system 100. In particular, the steps of the method 500 described below are effected by instructions in the software that are carried out by the computer. The instructions may be formed as one or more code modules, each for performing one or more particular tasks. The software may also be divided into two separate parts, in which a first part performs the method 500 and a second part manages a user interface between the first part and the user. The software may be stored in a computer readable medium, including the storage devices described below, for example. The software is loaded into the computer from the computer readable medium, and then executed by the computer. A computer readable medium having such software or computer program, recorded on it is a computer program product. The use of the computer program product in the computer preferably effects an advantageous apparatus for implementing the arrangements described here in.

The computer system 100 comprises a computer module 101, input devices such as a keyboard 102 and mouse 103, output devices including a printer 115 and a display device 114. A Modulator-Demodulator (Modem) transceiver device 116 is used by the computer module 101 for communicating to and from a communications network 120, for example connectable via a telephone line 121 or other functional medium. The modem 116 can be used to obtain access to the Internet, and other network systems, such as a Local Area Network (LAN) or a Wide Area Network (WAN).

The computer module 101 typically includes at least one processor unit 105, a memory unit 106, for example formed from semiconductor random access memory (RAM) and read only memory (ROM), input/output (I/O) interfaces including a video interface 107, and an I/O interface 113 for the keyboard 102 and mouse 103 and optionally a joystick (not illustrated), and an interface 108 for the modem 116. A storage device 109 is provided and typically includes a hard disk drive 110 and a floppy disk drive 111. A magnetic tape drive (not illustrated) may also be used. A CD-ROM drive 112 is typically provided as a non-volatile source of data. The components 105 to 113 of the computer module 101, typically communicate via an interconnected bus 104 and in a manner, which results in a conventional mode of operation of the computer system 100 known to those in the relevant art. Examples of computers on which the described arrangements can be practiced included IBM-PC's and compatibles, Sun Sparcstations or alike computer systems evolved therefrom.

Typically, the application program is resident on the hard disk drive 110 and read and controlled in its execution by the processor 105. Intermediate storage of the program and any data fetched from the network 120 may be accomplished using the semiconductor memory 106, possibly in concert with the hard disk drive 110. In some instances, the application program may be supplied to the user encoded on a CD-ROM or floppy disk and read via the corresponding drive 112 or 111, or alternatively may be read by the user from the network 120 via the modem device 116. Still further, the software can also be loaded into the computer system 100 from other computer readable media. The term "computer readable medium" as used herein refers to any storage or transmission medium that participates in providing instructions and/or data to the computer system 100 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 101. Examples of transmission media include radio or infra-red transmission channels as well as a network connection to another computer or networked device, and the Internet or Intranets including email transmissions and information recorded on websites and the like.

The steps of the method 500 integrate a halftone process with an existing host rendering system executing on the computer system 100. In the method 500, areas of constant colour are converted to a tiled representation, which can be used to represent the halftoned colour for any area of an image no matter how large. Thus, the method 500 improves the performance of the host rendering system for a wide range of output pages. Further, in the method 500, bitmap image data can be converted into a corresponding halftoned representation on demand, thus saving considerable memory during the rendering of the corresponding image.

The steps of the method 500 are performed on a scanline basis as a rendering system generates runs of pixel data from one edge crossing to the next, and are performed on demand. In the method 500, an image is rendered utilizing a display list or array of graphical objects representing the image where the objects are converted into a halftoned representation before being output for printing on a page. Preferably, dithering is performed on the objects of the image before being output. Alternatively, error diffusion, binarization or any other halftoning technique known to those in the relevant art can be performed on the objects of the image. The generation of an output in such a manner reduces the work typically required in halftoning areas of objects and does not require the use of a frame buffer. The method 500 also performs color conversion on graphical objects if required.

Graphical objects to be rendered using the method 500 can define areas of flat or blended color, bitmap image data, or tiled image data, for example. In the method 500, halftoned data can be pre-calculated for different object types (e.g. text objects, graphic objects, image objects) and the halftoned data can be stored along with original input data representing the graphical objects to be rendered. As described above, the halftoned data can be based on any dithering technique known to those in the relevant art. Alternatively, the halftoned data can be based on error diffusion, binarisation or any other halftoning technique known to those in the relevant art. Where an object of an image is known to be fully opaque, halftoned data associated with the opaque object can be used to directly render the image rather than applying transparency as a separate post-rendering step, as is often performed inconventional rendering methods. Rendering of flat coloured objects using the method 500 greatly reduces the number of pixels that must be color converted and halftoned compared to conventional rendering methods. Further, only the area of an object of the image that is actually visible is processed. Thus, the amount of memory used to render graphical objects is reduced over, for example, a conventional printer rendering method requiring a temporary frame store.

Still further, if an object on a page to be rendered is not opaque, the original colour or image data of the object is available at full accuracy for a compositing operation or logical raster operation that depends on the data. However, if all graphical objects on a page are known to be fully opaque, such original input data can be discarded, resulting in still further memory savings.

Still further, in a system where a list of object data (i.e., display list) resides in memory 106 and the rendering of the object data in accordance with the method 500 is executed by the printer 115, for example, the method 500 can reduce the size of an associated spool file significantly. The reduction in the size of the spool file is realised since the original contone bitmap data is replaced with equivalent halftoned data before the spooling of the display list to the printer 115.

Figure 2:
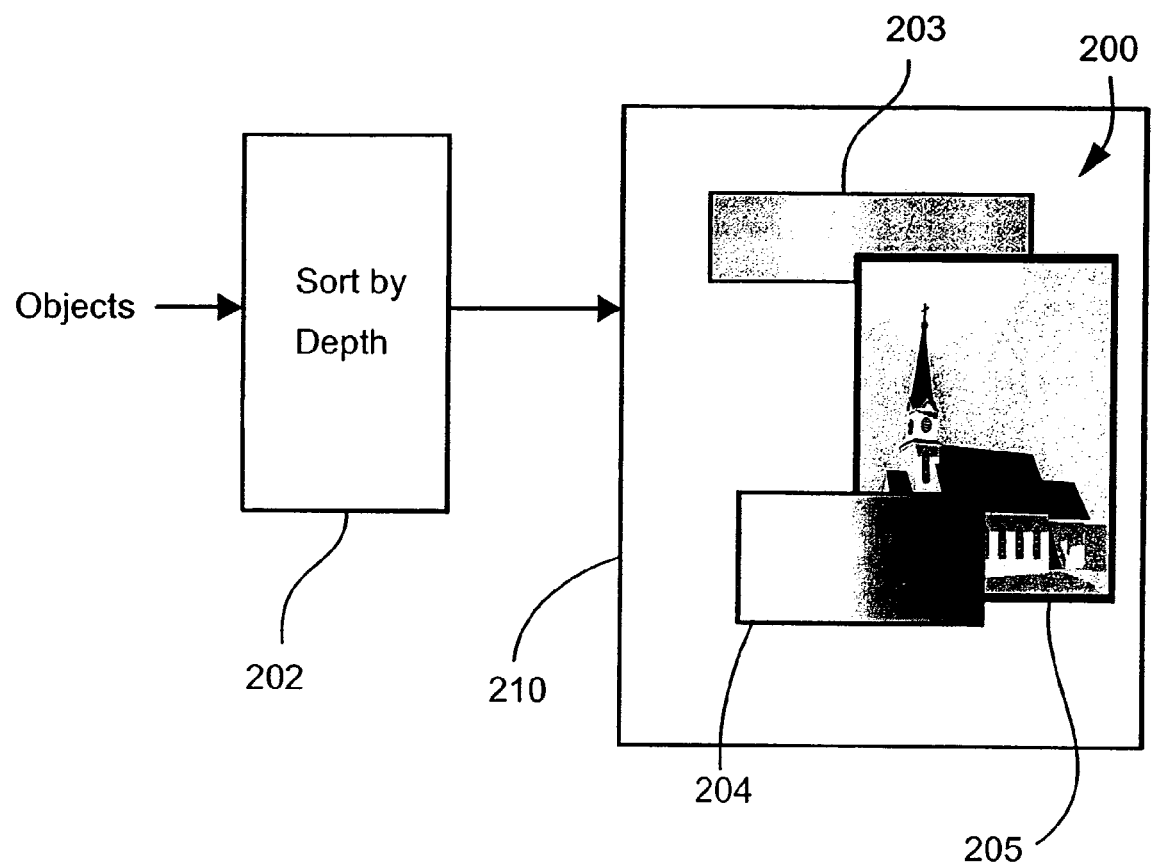
FIG. 2 is block diagram showing an overview of a method of rendering an image.
Figure 3:
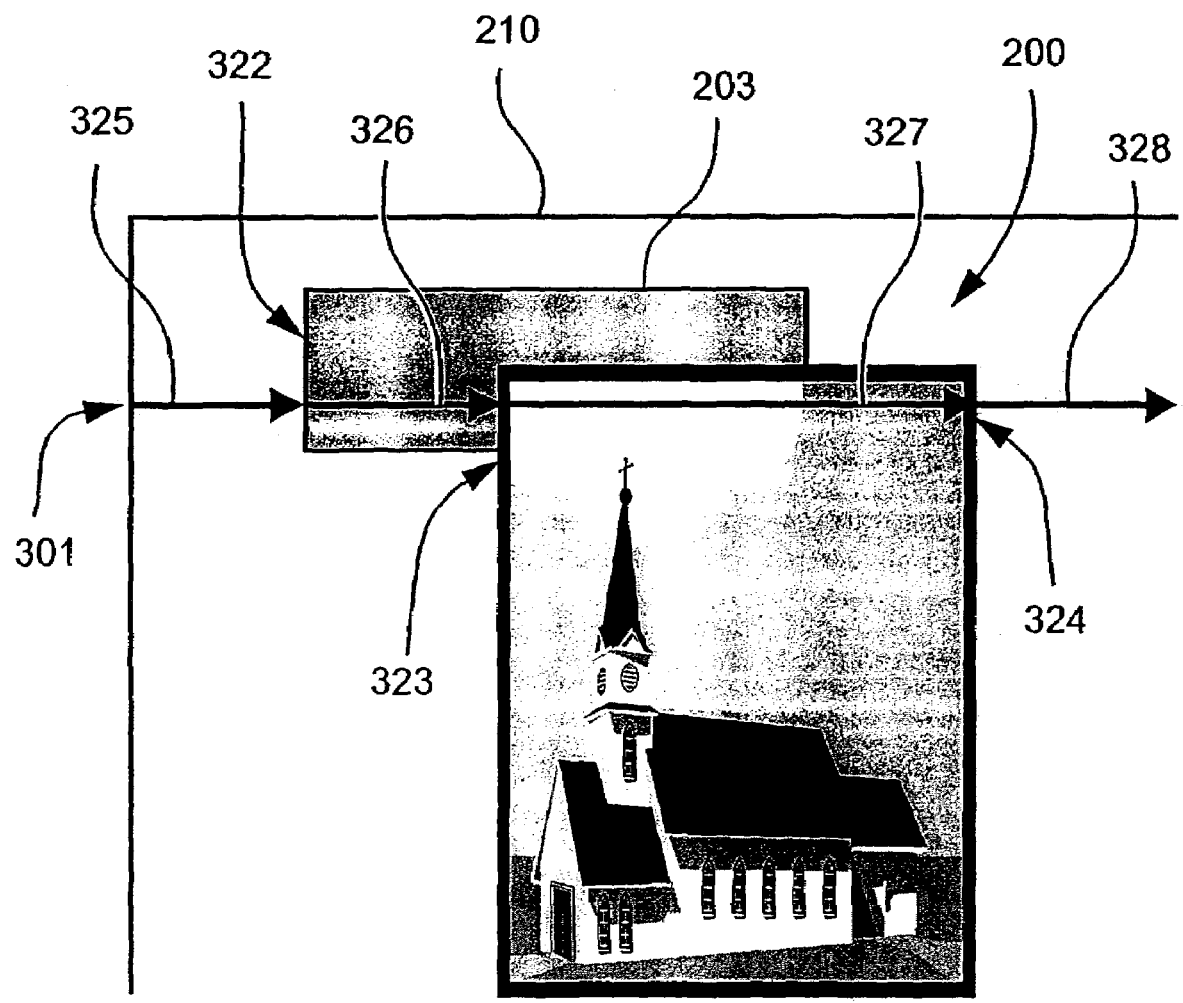
FIG. 3 shows pixel runs generated for the image of FIG. 2.

Referring to FIG. 2, in the method 500, an image 200 comprising objects 203, 204 and 205, for example, is rendered by generating edge-crossing information during a scan of the image 200. The edge-crossing information is extracted from a list of graphical objects 202, representing the image 200, where the list 202 is pre-ordered by depth (i.e. z-order). The edge crossing information is then used to generate runs of pixels to be output to a printer (e.g. the printer 115) for printing on a page 210. For example, FIG. 3 shows a portion of the image 200 where a scanline 301 crosses edges 322, 323 and 324 resulting in pixel runs 325, 326, 327 and 328.

As discussed above, the method 500 can be utilised to render flat colours (i.e. areas of constant colour) (e.g. the object 203), colors interpolated between two endpoints (e.g. the object 204), and bitmap image data (e.g. the bitmap image 205). The method 500 can also be utilised to render bitmap image data that is repeated or tiled throughout an area being rendered. In particular, areas of constant color are converted into a tiled representation, which is then used in a halftoning operation for that area of the image.

The method 500 is preferably implemented as an application program being resident on the hard disk drive 110 and being read and controlled in its execution by the processor 105. The method 500 begins at step 501, where the processor 105 detects a first graphical object to be rendered. At the next step 503, the graphical object is decomposed by the processor 105 into a set of edges defining the object, priority information for the object, a raster operation for the object and a corresponding winding rule for the object. The method 500 continues at the next step 505 where the set of edges defining the object are added to an edge database configured within memory 106. At the next step 507, if all objects of the image have been received by the processor 105, then the method 500 continues at the next step 509. Otherwise, the method 500 returns to step 501.

At step 509, the edges stored in the edge database configured within memory 106, are sorted in ascending y-coordinate, ascending x-coordinate, and ascending priority order (i.e. z-order). At the next step 511, the processor 105 selects a scanline for the image to be rendered. For each pixel run on the scanline selected at step 511, objects having an edge entered by the scanline are activated and objects having an edge exited by the scanline are de-activated, at the next step 513. The method 500 continues at the next step 514, where if the highest priority active object for a current pixel run is opaque, then the method 500 continues at the next step 515. Otherwise, the method 500 proceeds to step 517. At step 515, if fill data for the highest priority object has been halftoned, then the method 500 proceeds to step 519. Otherwise, the method 500 proceeds to step 516 where halftone information is generated for the fill data of the object and is stored in memory 106 together with the original fill data for the object. The method 500 continues at the next step 519, where the pixel run is output, using halftoned fill data for printing on a printer (e.g. the printer 105).

At step 517, fill data for all visible objects of the current pixel run are composited together to generate data for the pixel run. Also at step 517, the data for the current pixel run is halftoned and then output for printing. At the next step 521, if all pixel runs have been processed for the current scanline, then the method 500 continues at the next step 523. Otherwise, the method 500 returns to step 513. At step 523, if all scanlines have been processed for the image to be rendered, then the method 500 concludes. Otherwise, the method 500 returns to step 511 where a next scanline is selected by the processor 105.

Figure 4:
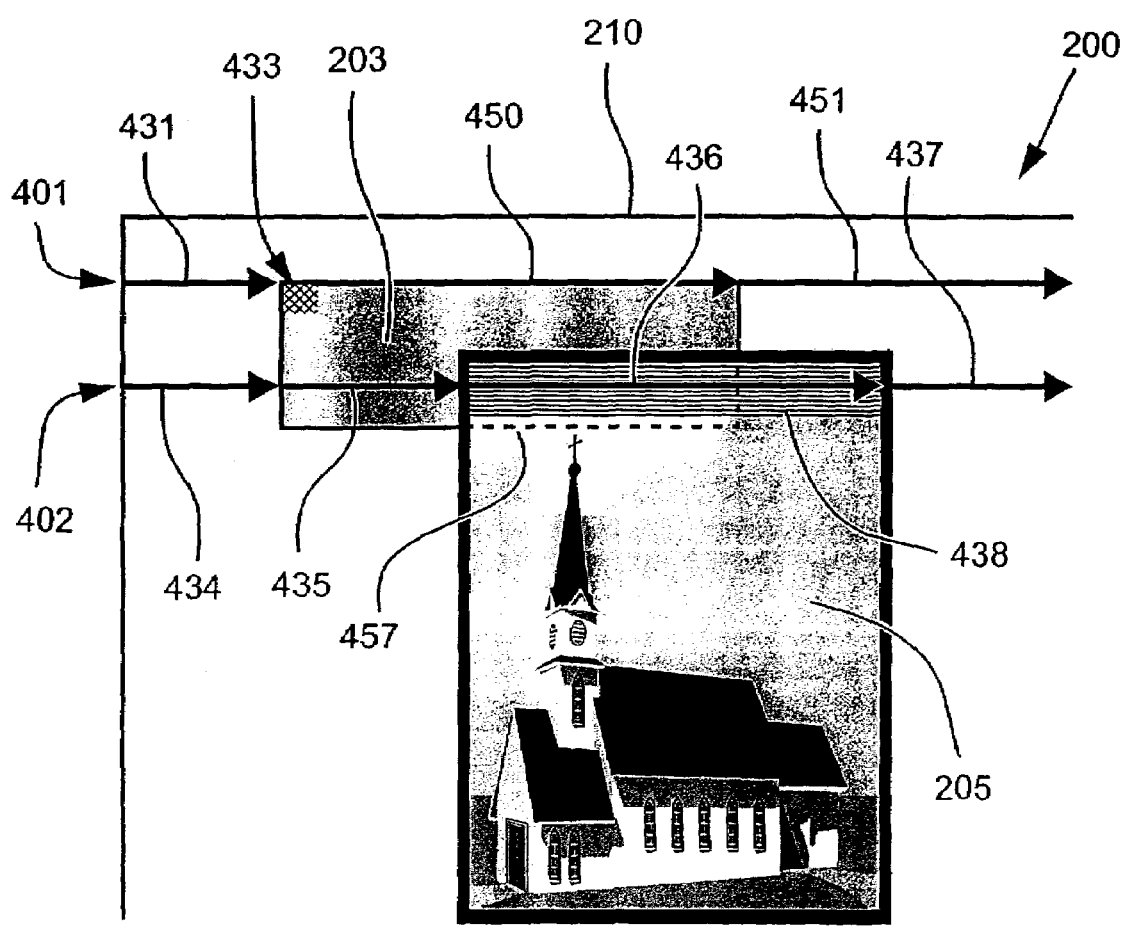
FIG. 4 shows the image of FIG. 2 generated in accordance with the arrangements described.

The method 500 will now be further explained with reference to the example of FIGS. 2 to 4. Referring to FIG. 4, scanlines are preferably generated downwards from the top of a page 210 to be rendered. However, a person skilled in the relevant art would appreciate that scanlines can also be generated from the bottom of the page 210. As seen in FIG. 4, pixel runs 431, 450 and 451 are generated for the scanline 401 and pixel runs 434, 435, 436 and 437 are generated for the scanline 402. Any scanlines prior to scanline 401 do not intersect any of the graphical objects 203 or 205, so pixel runs generated by the scanlines prior to the scanline 401 do not result in any halftoned output. This is also true for the pixel run 431. The first non-white graphical object encountered during the scanline process is the flat fill object 203. In the method 500, the object 203 is converted into a tiled image 433 representing a portion of the object 203 and all subsequent pixel runs within the flat fill object 203 from the scanline 401 onwards, use the tiled image 433 to generate halftoned output directly for printing on the printer 115. Generating pixel runs in this manner results in an improvement in both speed and efficiency over conventional methods of rendering since tiled images can be rendered by a computer system (e.g. the computer system 100) with little overhead.

For the scanline 402, the pixel run 434 will be white and the pixel run 435 will utilise the tiled image 433. In the method 500, for the pixel run 436, a portion of the image object 205 is converted into a halftoned image 438 (i.e. represented by the shaded area) as seen within the image object 205. The halftone image 438 is used for all subsequent pixel runs within the image object 205 assuming that the image object 205 is fully opaque in the region of overlap 457 (i.e. represented by the phantom line) between the object 203 and the object 205. In contrast, if the image object 205 is not fully opaque then the region of overlap 457 is composited using the original data of the flat fill object 203 and the image object 205. The result of the compositing operation is then halftoned. It is noted however that such compositing is only required within the region of overlap 457 and then only if the corresponding compositing or logical raster operation requires such action.

Continuing the example of FIG. 4, if it is known in advance that none of the graphical objects 203, 205 or 204 require compositing since all of the objects are opaque, then the original bitmap data for the image object 203 can be discarded after the halftoned image is generated. Such action results in a large reduction in memory usage for a 24-bit RGB contone image, for example. The original data for such an RGB image uses three bytes per pixel, while a four bit per pixel halftoned representation of the image at the same resolution packs two pixels into a byte, providing an improvement of 6:1.

The steps of the method 500 are preferably performed as the processor 105 generates runs of pixel data from one edge crossing to the next. This results in several advantages over conventional rendering methods. Firstly, only the area of each graphical object that is actually visible within one or more pixel runs is processed. Secondly, if an object is not opaque then the original fill color or image data for the object is available at full accuracy for any compositing operation or logical raster operation that depends on the object. Thirdly, if it is known that no transparent graphical objects exist on a page to be rendered, data associated with hidden objects (i.e. lower priority objects) may be discarded after the data associated with the lower priority objects has been halftoned, resulting in considerable memory savings for image data. Finally, bitmap image data can be converted into a halftoned representation on demand, thus saving considerable memory.

The method 500 can alternatively be implemented in dedicated hardware such as one or more integrated circuits performing the functions or sub functions of FIG. 5. Such dedicated hardware may include graphic processors, digital signal processors, or one or more microprocessors and associated memories.

The aforementioned method comprises a particular control flow. There are many other variants of the method which use different control flows without departing the spirit or scope of the invention. Furthermore one or more of the steps, of the methods may be performed in parallel rather than sequentially.

The foregoing describes only some embodiments of the present invention, and modifications and/or changes can be made thereto without departing from the scope and spirit of the invention, the embodiments being illustrative and not restrictive.

What is claimed is:

1. A method of rendering a plurality of graphical objects of an image on a scanline basis, each scanline comprising at least one run of pixels, each run of pixels being associated with at least one of the graphical objects such that the pixels of the run are within edges of the at least one graphical object, said method comprising the steps of:
   (I) decomposing each of the graphical objects into at least one edge representing the corresponding graphical object;
   (II) sorting one or more arrays containing the edges representing the graphical objects of the image, at least one of the arrays being sorted in an order from a highest priority graphical object to a lowest priority graphical object; and
   (III) for each run of pixels of at least one of the scanlines:
      (III) (i) determining edges of the graphical objects defining the run, graphical objects contributing to the run of pixels and edges of the contributing graphical objects, using the one or more arrays; and
      (III) (ii) if a highest priority graphical object contributing to the run of pixels is opaque:
         generating the run of pixels by halftoning fill data within the edges of the highest priority contributing graphical object, and
         determining a tiled representation of a portion of the highest priority contributing graphical object using the halftone fill data, wherein the tiled representation is used to generate subsequent runs of pixels corresponding to the highest priority contributing graphical object,
         otherwise generating the run of pixels by compositing data associated with the highest priority contributing graphical object and one or more further contributing graphical objects; and
         halftoning the composited data.

2. A method according to claim 1, further comprising the step of determining a contribution of a graphical object depending on where the edges of the graphical objects are crossed by a current scanline.

3. A method according to claim 1, wherein step (III) (ii) includes the further sub-step of storing the halftoned fill data for use in generating the subsequent runs of pixels.

4. A method of rendering a plurality of graphical objects of an image on a scanline basis, each scanline comprising at least one run of pixels, each run of pixels being associated with at least one of the graphical objects such that the pixels of the run are within the edges of the at least one graphical object, said method comprising the steps of:
   (I) decomposing each of the graphical objects into at least one edge representing the corresponding graphical object;
   (II) sorting one or more arrays containing the edges representing the graphical objects of the image, at least one of the arrays being sorted in an order from a highest priority graphical object to a lowest priority graphical object; and
   (III) for each run of pixels of at least one of the scanlines:
      (III) (i) determining edges of the graphical objects defining the run, graphical objects contributing to the run of pixels and edges of the contributing graphical objects, using the one or more arrays; and
      (III) (ii) if a highest priority graphical object contributing to the run of pixels is opaque:

generating the run of pixels by halftoning a portion of bitmap data within the edges of the highest priority contributing graphical object and replacing the portion of the bitmap data with the halftoned bitmap data, wherein the halftoned bitmap data is used to generate subsequent runs of pixels corresponding to the highest priority contributing graphical object, otherwise generating the run of pixels by compositing data associated with the highest priority contributing graphical object and one or more further contributing graphical objects, and processing the composited data.

* * * * *

UNITED STATES PATENT AND TRADEMARK OFFICE
CERTIFICATE OF CORRECTION

| | | |
|---|---|---|
| PATENT NO. | : 7,286,142 B2 | Page 1 of 1 |
| APPLICATION NO. | : 10/393249 | |
| DATED | : October 23, 2007 | |
| INVENTOR(S) | : David Christopher Smith | |

It is certified that error appears in the above-identified patent and that said Letters Patent is hereby corrected as shown below:

ON THE TITLE PAGE, ITEM [56] REFERENCES CITED:

U.S. PATENT DOCUMENTS, insert --6,201,614 B1 3/2001 Lin ........... 358/1.9--.

COLUMN 5:

Line 26, "inconventional" should read --in conventional--.

Signed and Sealed this

Eighth Day of September, 2009

David J. Kappos
*Director of the United States Patent and Trademark Office*